(12) United States Patent
Lajoie et al.

(10) Patent No.: US 8,931,022 B2
(45) Date of Patent: Jan. 6, 2015

(54) TECHNIQUE FOR PROVIDING SECURITY MEASURES FOR COMMUNICATIONS DEVICE CONNECTABLE TO A COMMUNICATIONS NETWORK

(75) Inventors: Michael L. Lajoie, Stamford, CT (US); James J Braun, Newton, CT (US)

(73) Assignee: Time Warner Cable Enterprises LLC, New York, NY (US)

(*) Notice: Subject to any disclaimer, the term of this patent is extended or adjusted under 35 U.S.C. 154(b) by 576 days.

(21) Appl. No.: 12/431,891

(22) Filed: Apr. 29, 2009

(65) Prior Publication Data
US 2009/0210916 A1 Aug. 20, 2009

Related U.S. Application Data

(62) Division of application No. 10/755,810, filed on Jan. 12, 2004, now Pat. No. 7,694,323.

(51) Int. Cl.
H04N 7/173 (2011.01)
H04N 21/443 (2011.01)
H04N 21/418 (2011.01)
H04N 7/16 (2011.01)
H04N 21/658 (2011.01)
H04N 21/24 (2011.01)
H04N 21/61 (2011.01)
H04N 21/258 (2011.01)
H04N 21/442 (2011.01)
H04N 21/426 (2011.01)

(52) U.S. Cl.
CPC ......... *H04N 21/443* (2013.01); *H04N 21/4181* (2013.01); *H04N 7/165* (2013.01); *H04N 21/6582* (2013.01); *H04N 21/2402* (2013.01); *H04N 21/6118* (2013.01); *H04N 21/25833* (2013.01); *H04N 21/25816* (2013.01); *H04N 7/17318* (2013.01); *H04N 21/658* (2013.01); *H04N 21/44209* (2013.01); *H04N 21/42684* (2013.01)
USPC ........... 725/107; 725/118; 725/119; 725/120; 725/25; 340/254; 340/257

(58) Field of Classification Search
USPC ............ 725/107, 118, 119, 120, 25; 370/254, 370/257
See application file for complete search history.

(56) References Cited

U.S. PATENT DOCUMENTS 5,237,610 A * 8/1993 Gammie et al. .............. 380/228
5,406,260 A 4/1995 Cummings et al.
(Continued)

OTHER PUBLICATIONS

"OpenCable Application Platform Specification," OCAP 2.0 Profile, OC-SP-OCAP2.0-101-020419, Cable Television Laboratories, Inc., Apr. 19, 2002.
(Continued)

*Primary Examiner* — Jun Fei Zhong
(74) *Attorney, Agent, or Firm* — Otterstedt, Ellenbogen & Kammer, LLP

(57) ABSTRACT

A user may purchase in a retail outlet a host device for receiving cable services. The cable operator needs to provide a point-of-deployment (POD) module for insertion into the host device to realize out-of-band communications, and provide conditional access to premium subscription channels. Security measures are implemented to detect removal of the host device from its connection to a broadband communications system. If its removal is unauthorized, the service area in which the host device is located may be identified when it is reconnected to the system. In addition, a transmission device in the host device may be activated to transmit detectable signals to help recover the host device.

36 Claims, 3 Drawing Sheets

(56) References Cited

U.S. PATENT DOCUMENTS

| | | | |
|---|---|---|---|
| 5,565,909 A * | 10/1996 | Thibadeau et al. | 725/35 |
| 5,748,084 A * | 5/1998 | Isikoff | 340/568.1 |
| 6,108,365 A * | 8/2000 | Rubin et al. | 375/130 |
| 6,272,150 B1 | 8/2001 | Hrastar et al. | |
| 6,989,747 B2 | 1/2006 | Konecnik | |
| 7,073,189 B2 | 7/2006 | McElhatten et al. | |
| 7,134,131 B1 | 11/2006 | Hendricks et al. | |
| 7,251,820 B1 * | 7/2007 | Jost et al. | 725/107 |
| 7,694,323 B2 * | 4/2010 | LaJoie et al. | 725/108 |
| 7,895,665 B2 * | 2/2011 | Gould et al. | 726/29 |
| 7,898,977 B2 * | 3/2011 | Roese et al. | 370/254 |
| 2002/0121975 A1 * | 9/2002 | Struble et al. | 340/571 |
| 2002/0157115 A1 | 10/2002 | Lu | |
| 2002/0177428 A1 | 11/2002 | Menard et al. | |
| 2004/0088734 A1 * | 5/2004 | Donlan et al. | 725/109 |

OTHER PUBLICATIONS

"OpenCable Host Device Core Functional Requirements," OC-SP=HOSR-CFR-113-030707, Cable Television Laboratories, Inc., Jul. 7, 2003.

"OpenCable HOST-POD Interface Specification," OC-SP-HOSTPOD-IF-113-030707, Cable Television Laboratories, Inc., Jul. 7, 2003.

* cited by examiner

300

500

TECHNIQUE FOR PROVIDING SECURITY MEASURES FOR COMMUNICATIONS DEVICE CONNECTABLE TO A COMMUNICATIONS NETWORK

CROSS REFERENCE TO RELATED APPLICATIONS

This application is a divisional of U.S. patent application Ser. No. 10/755,810, filed Jan. 12, 2004, now U.S. Pat. No. 7,694,323, the complete disclosure of which is expressly incorporated by reference herein in its entirety for all purposes.

FIELD OF THE INVENTION

The present invention generally relates to communications systems and methods, and more particularly to a system and method for securing communications equipment removable from its connection to a communications network, e.g., a cable network.

BACKGROUND OF THE INVENTION

In the cable industry, a point-of-deployment (POD) module (also known as a "CableCARD™") has been developed to satisfy certain security requirements to allow retail availability of host devices, e.g., set-top boxes, digital cable ready televisions, digital video recorders, personal computers (PCs), integrated digital televisions, etc., for receiving cable services. The POD module, comprising a PCMCIA device, can be inserted into a host device, allowing a viewer to receive cable systems' secure digital video services, e.g., pay per view TV, electronic program guides, premium subscription channels, video-on-demand (VOD) services, etc.

Specifically, the POD module contains conditional access functionality, as well as the capability of converting messages to a common format. Thus, the POD module provides a cable operator with a secure device at the user premises, and acts as a translator so that the host device needs to understand a single protocol, regardless of the type of the network to which it is connected. For example, with the POD modules provided by cable operators, host devices which run, e.g., on an Open-Cable Applications Platform (OCAP), may be sold in retail outlets. (For details on such a platform, one may refer, e.g., to: "OpenCable Application Platform Specification," OCAP 2.0 Profile, OC-SP-OCAP2.0-I01-020419, Cable Television Laboratories, Inc., Apr. 19, 2002.) The OCAP allows applications to be built to a common middleware layer for deployment on host devices interoperable across cable systems in North America. (For details on the functional requirements of one such host device, one may refer, e.g., to: "OpenCable™ Host Device Core Functional Requirements," OC-SP-HOSR-CFR-I13-030707, Cable Television Laboratories, Inc., Jul. 7, 2003.) With a common interface to the POD module, a host can be moved from one place to another, provided that the user of the host device contact his/her new cable operator to obtain a new POD module. (For details on such an interface, one may refer, e.g., to: "OpenCable™ HOST-POD Interface Specification," OC-SP-HOSTPOD-IF-I13-030707, Cable Television Laboratories, Inc. Jul. 7, 2003. To provision a new POD module and host device, an authorization process needs to be performed while the host device, with the POD module inserted therein, is connected to the cable network. The authorization process begins with the user's providing an ID(s) of the POD module and/or the host device (e.g., serial number(s)) to the cable operator. The cable operator looks up in a database a media access control (MAC) address of the POD module which typically is hard-coded in the POD module, and is associated with the POD module ID. During the authorization process, the cable operator may, for example, assign an Internet protocol (IP) address to the POD module for its identification in the cable network. The cable operator may also collect from the host device data concerning the make, model, and ID of the host device (e.g., its serial number). The cable operator may associate the POD module's MAC address (and/or IP address) with the user information, e.g., his/her name, address, etc. for billing purposes.

SUMMARY OF THE INVENTION

In prior art the POD module is designed to provide security measures for a cable operator, e.g., securing premium cable services provided by a cable operator. The invention however focuses on providing security measures with the POD module for a cable user and, in particular, a host device consumer.

In accordance with an aspect of the invention, a host device is programmed to send, through a communications network (e.g., a two-way multichannel delivery network, a cable network, etc.), a sequence of "pulse" signals which indicate continuity of its connection to the communications network. To detect a removal of the host device from its connection thereto, after receiving a first one of the pulse signals from the device, a security server determines whether a second one of the pulse signals is received within a period from the receipt of the first signal. The server generates an alert (including, e.g., informing the user of the host device of its potential unauthorized removal) if it is determined that the second signal is not received within the period.

Another aspect of the invention is directed to recovery of a host device after it is determined that the device has been removed from its connection to the communications network in an unauthorized manner. The host device is connectable to the communications network through one of the many possible nodes. These nodes are associated with respective ones of service areas. The device is identifiable by identifying data (e.g., its serial number). When the device is reconnected to the communications network through a particular node, a request for connection of the device to the communications network is received from the device. The request includes information concerning the device. The particular node is identified through which the request is received when it is determined that at least part of the information in the request corresponds to the identifying data. In that case, the device is presumed to be located in the service area associated with the particular node.

In accordance with a further aspect of the invention, the host device may include therein a transmission mechanism which can be remotely activated through the communications network. Once the device to be recovered has been identified to be connected to the communications network through the particular node, the security server remotely activates the transmission mechanism in the device to generate a detectable signal to facilitate locating the device within the service area associated with the particular node.

BRIEF DESCRIPTION OF THE DRAWINGS

Further objects, features and advantages of the invention will become apparent from the following detailed description taken in conjunction with the accompanying drawings showing illustrative embodiments of the invention, in which.

DETAILED DESCRIPTION OF PREFERRED EMBODIMENTS

The invention is directed to providing security measures for communications device connectable to a communications network, e.g., a two-way multichannel broadband communications network, such as a cable network. In the near future, digital cable users can purchase host devices (e.g., set-top boxes, digital cable ready televisions, digital video recorders, personal computers (PCs), integrated digital televisions, etc.) at retail outlets to receive cable services. To begin a cable service, the user may need to obtain a point-of-deployment (POD) module (also known as a "CableCARD™."), comprising a PCMCIA card, from a cable operator. When the user initially connects a host device, with the POD module inserted into its common interface, to a cable network, an authorization process to provision the host device is performed. The POD module enables the host device to communicate with the cable headend facility bidirectionally, and provides the host device with conditional access to secure digital cable video services, e.g., pay per view TV, electronic program guides, premium subscription channels, video-on-demand (VOD) services, etc.

It should be noted that in prior art the POD module is designed from the viewpoint of providing security measures for a cable operator, e.g., securing bidirectional connectivity to the cable network, and premium cable services provided by a cable operator. The invention however focuses on providing security measures with the POD module for a cable user and, in particular, a host device consumer.

In accordance with the invention, by utilizing one or more databases maintained by the cable operator concerning host devices and the associated POD modules, and two-way communications with a host device enabled by the associated POD module, a host device security service is realized to (a) detect when a host device is removed from its connection to the cable network and/or an attempt is made to utilize a removed (or stolen) host device, and/or (b) recover the removed (or stolen) host device.

Figure 1:
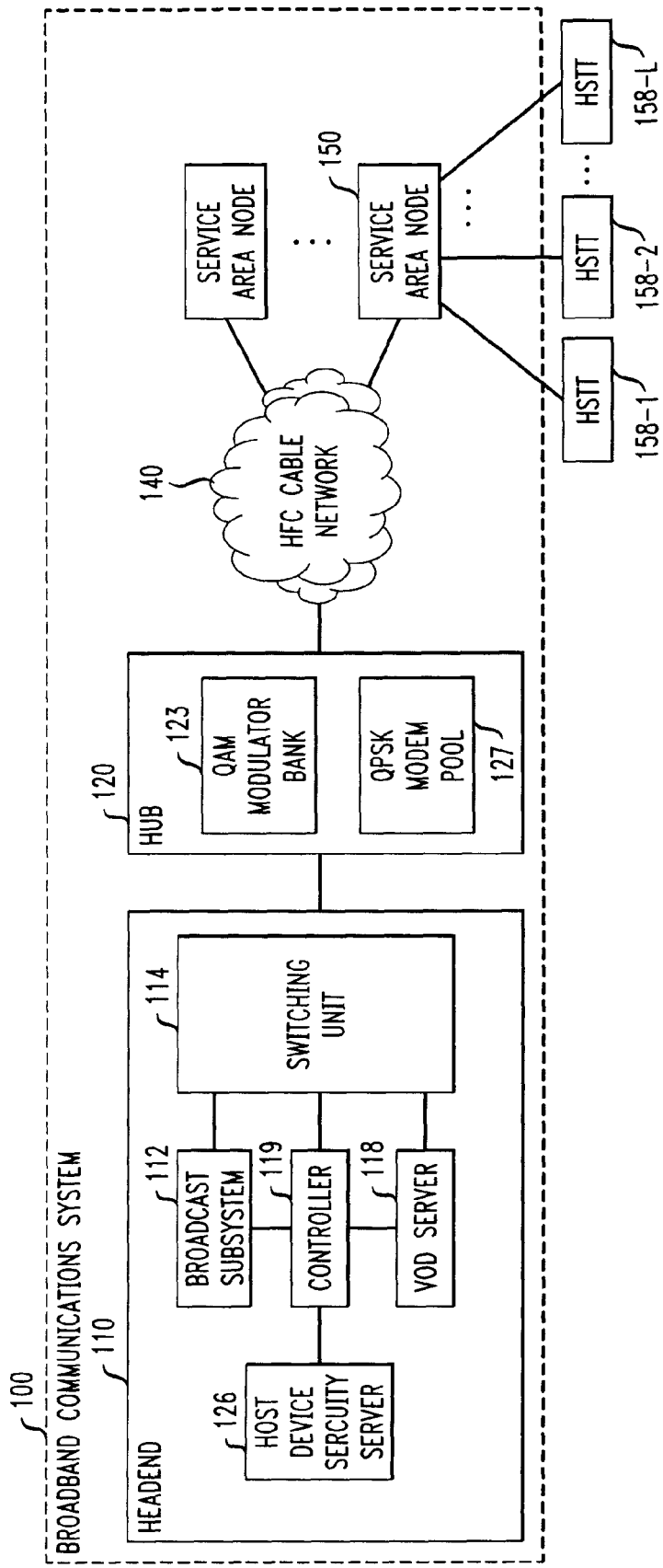
FIG. 1 is a block diagram of a broadband communications system to which host devices are connected in accordance with an embodiment of the invention.

FIG. 1 illustrates broadband communications system 100 embodying the principles of the invention. System 100 provides information and programming content to host devices, e.g., host set-top terminals (HSTTs) in this instance, at users' premises. As shown in FIG. 1, system 100 includes headend 110, hub 120, hybrid fiber coaxial (HFC) cable network 140, and service area node 150 which is connected to HSTTs 158-1 through 158-L in a neighborhood or service area, where L represents a predetermined number.

Headend 110 includes broadcast subsystem 112 which receives a composite program stream containing programming content from various content providers and sources, e.g., analog and digital satellite sources, application servers, media servers, etc. In a conventional manner, the received composite program stream is processed by subsystem 112, resulting in transport streams. Switching unit 114 switches the received transport streams to appropriate modulators in hub 120 to broadcast the programming content to users through transmission channels furnished by HFC cable network 140. It should be noted that the term "transmission channel" should not be confused with a "program channel." A "transmission channel" signifies a designated frequency band through which a program stream is transmitted. On the other hand, a "program channel" signifies the source of the program material selected by a user to view. For example, a user may select program channel 2 to view program material provided by CBS, program channel 14 to view program material provided by ESPN; program channel 32 to view program material provided by MTV, etc. In this illustrative embodiment, the transmission channels may be 6 MHz bands populating a forward passband, e.g., 350-750 MHz band, of a coaxial cable, which is allocated for downstream communication from headend 110 to a HSTT.

Video-on-Demand (VOD) server 118 performs such well known VOD functions as providing a program stream containing the requested VOD program for transmission to a requesting HSTT. The program stream may be transmitted through a dynamically assigned transmission channel.

Figure 2:
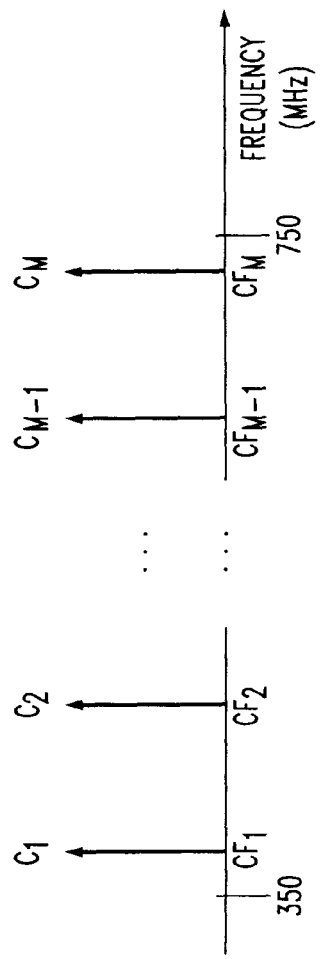
FIG. 2 illustrates selected carriers for transmitting information and program materials in a forward passband of the system.

QAM modulator bank 123 in this instance is located in hub 120 connected to headend 105 via IP transport on the one hand and to HFC cable network 140 on the other hand. Bank 123 includes multiple modulators, each of which is used to modulate transport streams onto different carriers. Each modulated carrier carrying a transport stream is transmitted through a transmission channel associated therewith. FIG. 2 illustrates M carriers, $C_1$ through $C_M$, associated with M transmission channels in the forward passband. As shown in FIG. 2, the carrier frequency of $C_1$ is denoted $CF_1$; the carrier frequency of $C_2$ is denoted $CF_2$; . . . ; and the carrier frequency of $C_M$ is denoted $CF_M$. In this example, each program stream may contain 4.2 Mb/s video and audio program material. By using a 256-quadrature-amplitude-modulation (256-QAM) technique and 6 MHz transmission channel, each modulator in modulator bank 123 in this instance may modulate 9 or more program streams, multiplexed in a transport stream, onto the corresponding carrier. The resulting modulated carrier is transmitted through the transmission channel associated with the carrier.

Upstream data from a HSTT to headend 110 is communicated via a reverse passband, e.g., 5-40 MHz band, of a coaxial cable. The reverse passband comprises reverse data channels (RDCs) having a 1 MHz bandwidth in this instance, through which quaternary phase shift keying (QPSK) signals containing upstream data are transmitted. It should be noted that the 1 MHz bandwidth allocated for an RDC here is for illustrative purposes only. It will be appreciated that a person skilled in the art may allocate other bandwidths therefor depending on the actual implementations. An HSTT (e.g., 158-1), with a POD module (e.g., 165) inserted therein, utilizes an RDC for sending both application data and control messages. The Digital Audio Visual Council (DAVIC), a standard setting organization, has defined a contention-based access mechanism whereby multiple HSTTs can share an RDC. This mechanism enables the HSTTs to transmit upstream data without a dedicated connection to a QPSK demodulator in QPSK modem pool 127. The mechanism also provides equal access to the HSTTs that share the RDC, and enables detection and recovery from reverse path collisions that occur when two or more of the HSTTs transmit upstream data simultaneously.

Downstream data from headend 110 to HSTTs is modulated using QPSK modulators in modem pool 127 onto forward data channels (FDCs). These channels, often referred to as "out-of-band (OOB)" channels, may occupy the 70-130 MHz band of a coaxial cable. QPSK signals containing system messages to an HSTT are transmitted through an FDC having a 1 MHz bandwidth in this instance. It should be noted that the 1 MHz bandwidth allocated for an FDC here is for illustrative purposes only. It will be appreciated that a person skilled in the art may allocate other bandwidths therefor depending on the actual implementations.

For upstream and downstream data communications (collectively referred to hereinafter as "OOB communications") via an RDC and FDC, respectively, although the HSTT provides the QPSK physical layer (e.g., a QPSK modem), the POD module is necessary to implement the actual data link and media access control (MAC) protocols to realize the OOB communications, in accordance with the well known OpenCable Host-POD interface specification. Thus, for example, without the associated POD module 165, HSTT 158-1 is incapable of OOB communications.

When an HSTT, say, HSTT 158-1, is first provisioned, the user needs to obtain a POD module, say, module 165, from the cable operator. An authorization process needs to be performed while HSTT 158-1, with POD module 165 inserted therein, is connected to cable system 100. The authorization process begins with the user's providing an ID of POD module 165 (e.g., its serial number) to the cable operator. The cable operator looks up in a database a MAC address of module 165 which typically is hard-coded in the module, and associated with the POD module ID. During the authorization process, the cable operator assigns an Internet protocol (IP) address to POD module 165 for its identification in the network, and associates the MAC address (and/or IP address) of POD module 165 with the ID of HSTT 158-1 in a database maintained by the cable operator.

In this illustrative embodiment, each service area node is associated with a different range of IP addresses assignable to a POD module. Thus, the IP address assigned to POD module 165 is selected from a range of predetermined IP addresses associated with service area node 150 to which POD module 165, together with HSTT 158-1, is connected. Service area node 150 may be identified by the cable operator based on the postal address of the user premises from where HSTT 158-1 accesses system 100. This postal address, along with the name of the user and other user information, is also provided by the user, which is necessary for establishing a user account for cable service billing anyway.

Figure 3:
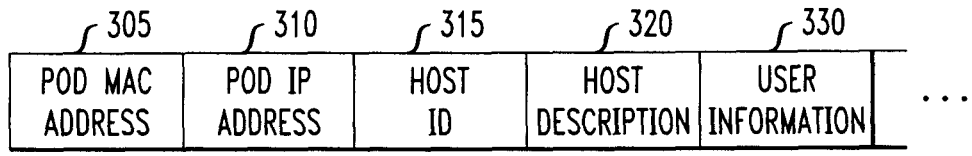
FIG. 3 illustrates a user record containing information concerning a host device in accordance with an embodiment of the invention.

After the aforementioned authorization process, with the IP address assigned and stored in module 165, module 165 is ready for OOB communications between controller 119 and HSTT 158-1. Based on the IP address of module 165, controller 119 may then send to associated HSTT 158-1 via an FDC a request for data concerning the device description (e.g., device type, model and make) and ID (e.g., serial number) of HSTT 158-1. In response, HSTT 158-1 provides the requested data, which is stored therein, to controller 119 via an RDC. Controller 119 compiles the received HSTT data, and other data in a user record in a database (not shown). FIG. 3 illustrates one such user record (denoted 300) associated with the user of HSTT 158-1.

As shown in FIG. 3, user record 300 includes, among others, POD MAC address field 305 containing the MAC address of POD module 165 in this instance, POD IP address field 310 containing the IP address assigned to module 165, host ID field 315 containing the serial number of HSTT 158-1, host description field 320 containing data concerning the device type (e.g., set-top terminal) model and make of HSTT 158-1, and user information field 330 containing the name, postal address, telephone number(s), e-mail address, etc. of the user.

A First Embodiment

In accordance with a first embodiment of the invention, software (e.g., a resident application) is installed in, e.g., downloaded from headend 110 to, a host device, say HSTT 158-1, whereby HSTT 158-1 is programmed to send, from time to time, a "pulse" message via an RDC to host device security server 126 at a designated IP address. For example, the pulse message may contain a message type field indicating that the message is a pulse message, the IP address (and/or MAC address) of module 165 and the ID of HSTT 158-1.

Figure 4:
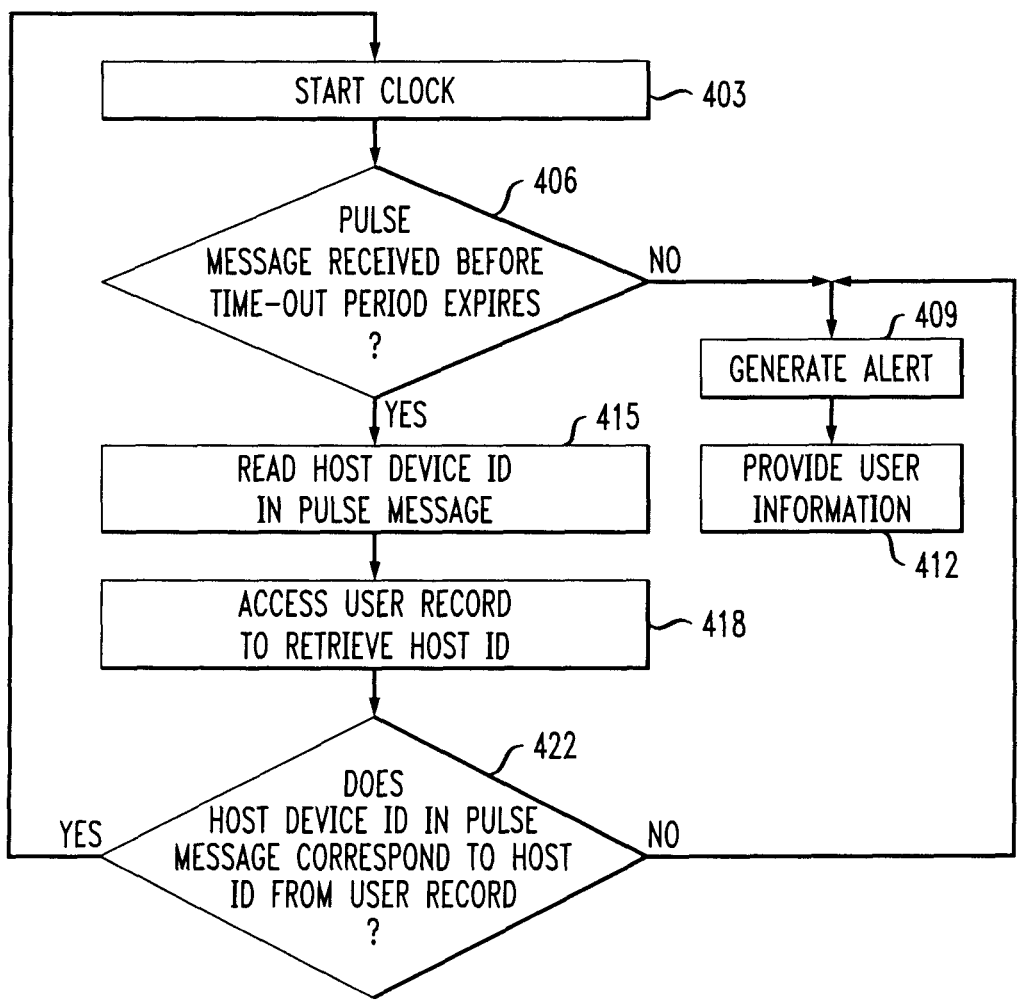
FIG. 4 is a flow chart depicting a process for detecting a removal of a host device from the system in accordance with an embodiment of the invention.

In accordance with the invention, host device security server 126 relies on the receipt of pulse messages from a host device on a regular basis to determine its continuous connection to system 100. For example, as soon as HSTT 158-1 is authorized to be used with system 100, HSTT 158-1 sends to server 126 an initial pulse message, containing the IP address of POD module 165 and ID of HSTT 158-1, consistent with user record 300. Upon receipt of the initial pulse message, server 126 establishes a clock associated with HSTT 158-1 for tracking a time-out period within which a pulse message from HSTT 158-1 is expected. Server 126 then starts the clock, as indicated at step 403 in FIG. 4. At step 406, server 126 determines whether any pulse message originating from the IP address of module 165 is received before the time-out period expires. If not, server 126 at step 409 generates an alert, and at step 412 accesses user record 300 to provide the cable operator with user information from field 330, thereby prompting the cable operator to contact the user to inform him/her of a potential unauthorized removal of the HSTT 158-1 from its connection to system 100.

Otherwise, if server 126 receives a pulse message originating from the IP address of module 126 within the time-out period, it reads the host device ID also contained in the pulse message, as indicated at step 415. Server 126 at step 418 accesses user record 300 to retrieve the host ID from field 315, which in this instance contains the ID of HSTT 158-1. Server 126 at step 422 determines whether the host device ID in the received pulse message corresponds to the host ID (i.e., the ID of HSTT 158-1) from user record 300. If so, the subject routine returns to step 403 to restart the clock. Otherwise, if they do not correspond, the subject routine proceeds to steps 409 and 412 described before, based on an assumption that someone has replaced HSTT 158-1 with another host device, although with the same POD module 126 inserted therein. With steps 409 and 412, the cable operator is prompted to contact the user to inform him/her of such a host device replacement which may be unauthorized. In the meantime, the cable operator may deny a service or group of services to the substitute host device by causing POD module 165 to exercise conditional access security measures.

A Second Embodiment

The second embodiment is based upon the premise that the cable operator has learned that a user's host device, say, HSTT 158-1, was stolen, e.g., by the user reporting the theft to the cable operator, or by confirming the theft as in the first embodiment. In a first scenario where POD module 165 was stolen with HSTT 158-1, the cable operator retrieves, from record 300 associated with the user, the ID of stolen HSTT 158-1 (conveniently referred to hereinafter as the "outstanding host ID") and the IP address and/or MAC address of POD module 165 (conveniently referred to hereinafter as the "outstanding POD address"). The cable operator updates a theft list, in this instance maintained by server, with the outstanding host ID and POD address to detect any reconnection by the perpetrator of stolen HSTT 158-1 and module 165 to broadband communication system 100. In addition, data concerning the outstanding host ID and POD address are also communicated to other cable operators for updating their theft lists in case the perpetrator reconnects the stolen HSTT 158-1 and module 165 to systems administered by the other cable operators.

Figure 5:
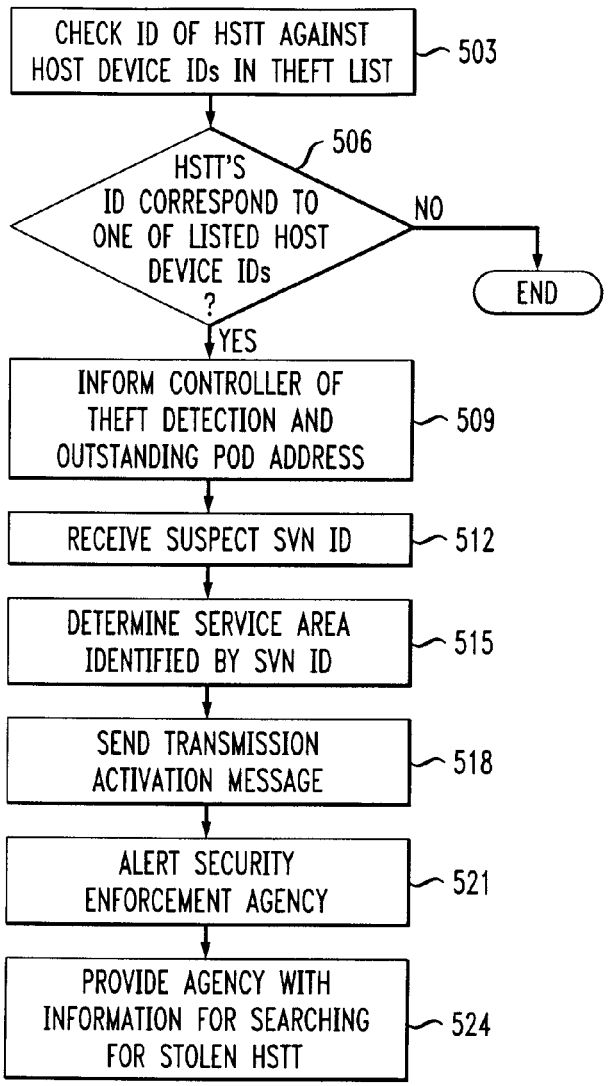
FIG. 5 is a flow chart depicting a process for recovering a stolen host device in accordance with an embodiment of the invention.

By way of example, let's say the perpetrator in this instance reconnects stolen HSTT 158-1, together with module 165, to system 100 through a service area node which may or may not be the same as node 150. In a well known manner, one such reconnection triggers a sign-on process, where stolen HSTT 158-1 sends a sign-on request to controller 119. This sign-on request includes the ID of HSTT 158-1 and the IP address of POD module 165. After receiving the request, controller 119 retrieves record 300 based on the received POD module IP address, and in this instance determines that the received host ID is coupled with the POD module IP address based on record 300. Thus, controller 119 continues with the sign-on process where it informs host device security server 126 of the ID of HSTT 158-1, which then performs routine 500 in FIG. 5. Otherwise, if controller 119 determines that the received host ID and POD module IP address are not coupled with each other, controller 119 denies the sign-on request, and requires an authorization process described before.

In accordance with routine 500, host device security server 126 at step 503 checks the received ID of HSTT 158-1 against the host device IDs in the theft list. At step 506, server 126 determines whether the HSTT's ID corresponds to one of the listed host device IDs. If not, routine 500 comes to an end. Otherwise, as in the instant case where the received ID of HSTT 158-1 corresponds to the outstanding host ID in the list, server 126 informs controller 119 of a theft detection and the associated outstanding POD address in the list, as indicated at step 509. In response, controller 119 may cause POD module 165, identified by the outstanding POD address, to exercise conditional access security measures to deny a service or group of services to stolen HSTT 158-1. In accordance with an aspect of the invention, controller 119 checks the routing of the sign-on request originating from the outstanding POD address and, in particular, the service area node from which the sign-on request was routed (the "suspect service area node (SVN)"). Controller 119 then conveys to server 126 an ID identifying the suspect SVN to which stolen HSTT 158-1 is currently connected. After server 126 receives the suspect SVN ID, as indicated at step 512, server 126 at step 515 determines the service area ("suspect service area") identified by the suspect SVN in which stolen HSTT 158-1 is located.

Figure 6:
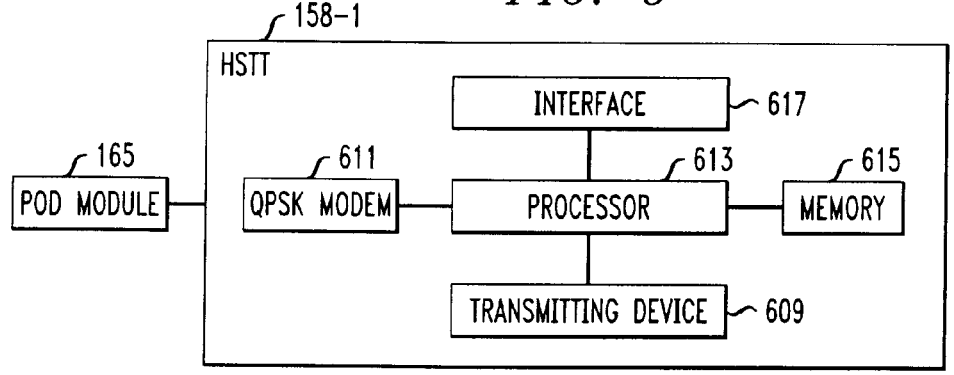
FIG. 6 is a block diagram of a host device in accordance with an embodiment of the invention.

To recover a stolen host device in a suspect service area, in accordance with another aspect of the invention, a transmitting device is included in a host device, which may be remotely activated to transmit a predetermined signal associated with the host device. For example, as shown in FIG. 6, HSTT 158-1 in this instance includes therein one such transmitting device, denoted 609. HSTT 158-1 also includes QPSK modem 611 which enables HSTT 158-1 to perform OOB communications through POD module 165. Processor 613 orchestrates the operations of HSTT 158-1, in accordance with software applications, parameters (e.g., user preferences), tables (e.g., program channel and service tables), etc. stored in memory 615. Interface 617 includes, e.g., QAM demodulator for receiving programming content from system 100, and I/O interfaces with entertainment units such as a TV.

Continuing the above example where stolen HSTT 158-1 was located in the suspect service area, server 126 at step 518 sends, through an FDC, a transmission activation message destined to the outstanding POD address. Based on the destination address, this message is routed to POD module 165, demodulated by QPSK modem 611 in HSTT 158-1, and processed by processor 613. Instructed by the activation message, processor 613 causes transmitting device 609 to be activated. Device 609, when activated, transmits a predetermined radio frequency (RF) signal which may contain information identifying HSTT 158-1 (e.g., its ID), and is detectable in a service area. Server 126 at step 521 alerts a security enforcement agency (e.g., the police or private security company) of the theft, and at step 524 provides the agency with information for searching for stolen HSTT 158-1, e.g., the frequency of the predetermined signal to which an RF receiver should be tuned, the ID of HSTT 158-1, etc.

It should be noted that routine 500 may also be triggered when it is determined, e.g., by controller 119 that the IP address of POD module 126 in the sign-on request is not within the range of the predetermined POD module IP addresses associated with node 150. This would be the case if stolen HSTT 158-1, together with POD module 126, is reconnected through a service area node different than original node 150. In that case, controller 119 informs host device security server 126 of the ID of HSTT 158-1 in the sign-on request, which then performs routine 500.

In a second scenario where POD module 165 was not stolen with HSTT 158-1, or stolen but not used with HSTT 158-1 when reconnected to a broadband communications system. The perpetrator may (1) ask for a new POD module from a cable operator, or (2) use a substitute POD module not coupled with stolen HSTT 158-1. In either event, the aforementioned authorization process for provisioning HSTT 158-1 is triggered. Because of the known ID of stolen HSTT 158-1, the cable operator would not allow HSTT 158-1, together with the new or substitute POD module, to be used in the system. If the perpetrator provides, as part of the authorization process, a postal address of the user premises from where HSTT 158-1 accesses the system, the security enforcement agency would be informed of such a address to possibly recover stolen HSTT 158-1.

The foregoing merely illustrates the principles of the invention. It will thus be appreciated that those skilled in the art will be able to devise numerous other arrangements which embody the principles of the invention and are thus within its spirit and scope.

For example, the invention applies not only to detection and/or recovery of a stolen host device, but also to detection and/or recovery of a stolen POD module. To that end, for instance, both routines of FIGS. 4 and 5 may be implemented based on the stolen POD module IP (and/or MAC) address instead of the stolen host device ID.

Finally, system 100 is disclosed herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

What is claimed is:

1. A system for locating a device connected to a communications network through one of a plurality of nodes, the nodes being associated with respective ones of service areas, the device being identifiable by identifying data, the system comprising:
   an interface for receiving, through a first node, a request for connection by the device to the communications network, the request including information concerning the device; and
   a server for determining that at least part of the information concerning the device corresponding to the identifying data is present in a theft list,
   whereby the device is determined to be located in the service area associated with the first node;
   the server, responsive to the at least part of the information concerning the device corresponding to the identifying data present in the theft list, being further operative to:
   trigger an authorization process of the device;
   receive an indication of a current postal address location during the authorization process of the device; and
   cause to be provided to a security enforcement agency information about a location of the device including the current postal address location.

2. The system according to claim 1, wherein the server, responsive to the at least part of the information concerning the device corresponding to the identifying data present in the theft list, being further operative to:
   cause to be sent, over the communications network, to the device, a transmission activation message which activates a transmitter of the device to transmit a detectable radio frequency signal; and
   cause to be provided to the security enforcement agency information about the location of the device including information about the detectable radio frequency signal for identifying the device.

3. The system according to claim 1, wherein the communications network includes a two-way multichannel delivery network.

4. The system according to claim 3, wherein the delivery network includes a cable TV network.

5. The system according to claim 4, wherein the cable TV network includes an HFC cable network.

6. The system according to claim 4, wherein the device receives programming content from the communications network.

7. The system according to claim 6, wherein the device includes a host device having an interface for coupling with a POD module for providing conditional access to selected programming content.

8. The system according to claim 7, wherein the selected programming content is selected by the system.

9. The system according to claim 7, wherein the selected programming content includes VOD content.

10. The system according to claim 1, wherein the identifying data includes a serial number pre-assigned to the device.

11. The system of claim 1, wherein the information which the server causes to be provided to the security enforcement agency comprises at least a frequency of the detectable radio frequency signal to which a radio frequency receiver of the security enforcement agency should be tuned.

12. Apparatus for receiving programming content from a communications network, the apparatus comprising:
   an interface for coupling the apparatus with a device for effecting a communication to a server through the communications network;
   a modem which, enabled by the interface with the device:
   sends, from the apparatus, to the server, through a first node of the communications network, a request for connection of the device to the communications network after the device has first been properly connected to the communications network through a second node and then disconnected and improperly reconnected through the first node, the request including the identifying data of the apparatus, an address of the device within the communications network and a current postal address location of the apparatus obtained during an authorization process during the reconnection through the first node;
   receives, from the server, a transmission activation message upon determining that at least a part of the identifying data is present in a theft list accessible to the server; and
   a transmission mechanism, which, responsive to the transmission activation message, generates a detectable radio frequency signal receivable by a radio frequency receiver of a security enforcement agency for confirming a location of the apparatus at the current postal address location obtained during the authorization process.

13. The apparatus according to claim 12, wherein the address includes an Internet protocol (IP) address.

14. The apparatus according to claim 12, wherein the address includes a media access control (MAC) address.

15. The apparatus according to claim 12, wherein the identifying data includes a serial number pre-assigned to the apparatus.

16. The apparatus according to claim 12, wherein the detectable radio frequency signal contains information concerning a serial number pre-assigned to the apparatus.

17. The apparatus according to claim 12 comprising an entertainment unit.

18. The apparatus according to claim 17, wherein the entertainment unit includes a TV unit.

19. A method for locating a device connected to a communications network through one of a plurality of nodes, the nodes being associated with respective ones of service areas, the device being identifiable by identifying data, the method comprising:
   receiving, through a first node, a request for connection by the device to the communications network, the request including information concerning the device; and
   determining that at least part of the information concerning the device, corresponding to the identifying data is present in a theft list,
   whereby the device is determined to be located in the service area associated with the first node;
   further comprising, responsive to the at least part of the information concerning the device corresponding to the identifying data present in the theft list:
   triggering an authorization process of the device;
   receiving an indication of a current postal address location during the authorization process; and
   providing to a security enforcement agency information about a location of the device including the current postal address location.

20. The method according to claim 19, wherein, responsive to the at least part of the information concerning the device corresponding to the identifying data present in the theft list, being further operative to:
   cause to be sent, over the communications network, to the device, a transmission activation message which activates a transmitter of the device to transmit a detectable radio frequency signal; and cause to be provided to the security enforcement agency information about the location of the device including information about the detectable radio frequency signal contains information for identifying the device.

21. The method according to claim 19, wherein the communications network includes a two-way multichannel delivery network.

22. The method according to claim 21, wherein the delivery network includes a cable TV network.

23. The method according to claim 22, wherein the cable TV network includes an HFC cable network.

24. The method according to claim 22, wherein the device receives programming content from the communications network.

25. The method according to claim 24, wherein the device includes a host device having an interface for coupling with a POD module for providing conditional access to selected programming content.

26. The method according to claim 25, wherein the selected programming content is selected by the system.

27. The method according to claim 25, wherein the selected programming content includes VOD content.

28. The method according to claim 19, wherein the identifying data includes a serial number pre-assigned to the device.

29. The method of claim 19, wherein the providing step comprises at least providing to the security enforcement agency at least a frequency of the detectable radio frequency signal to which a radio frequency receiver of the security enforcement agency should be tuned.

30. A method for use in an apparatus for receiving programming content from a communications network, the apparatus including a transmission mechanism, the method comprising:

providing an interface for coupling the apparatus with a device for effecting a communication to a server through the communications network;

enabled by the interface with the device, sending, from the apparatus, to the server, through a first node of the communications network, a request for connection of the device to the communications network after the device has first been properly connected to the communications network through a second node and then disconnected and improperly reconnected through the first node, the request including the identifying data of the apparatus, an address of the device within the communications network and a current postal address location of the apparatus obtained during an authorization process during the reconnection through the first node; and receiving, from the server, a transmission activation message upon determining that at least a part of the identifying data is present in a theft list accessible to the server, the transmission activation message causing the transmission mechanism to generate a detectable radio frequency signal receivable by a radio frequency receiver of a security enforcement agency for confirming a location of the apparatus at the current postal address location obtained during the authorization process.

31. The method according to claim 30, wherein the address includes an IP address.

32. The method according to claim 30, wherein the address includes a MAC address.

33. The method according to claim 30, wherein the identifying data includes a serial number pre-assigned to the apparatus.

34. The method according to claim 30, wherein the detectable radio frequency signal contains information concerning a serial number pre-assigned to the apparatus.

35. The method according to claim 30, wherein the apparatus comprises an entertainment unit.

36. The method according to claim 35, wherein the entertainment unit includes a TV unit.

* * * * *